United States Patent
Pavet

(10) Patent No.: US 6,229,994 B1
(45) Date of Patent: May 8, 2001

(54) FITTING DEVICE FOR SEPARATE ELEMENTS OF A MOBILE TELEPHONE HANDSET AND THE HANDSET THUS OBTAINED

(75) Inventor: Franck Pavet, Ballon (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/244,209

(22) Filed: Feb. 4, 1999

(30) Foreign Application Priority Data

Feb. 10, 1998 (FR) .................................... 9801547

(51) Int. Cl.[7] .............................. H04B 1/02; H04B 1/08; H04B 1/38; H04M 1/00; H04M 9/00
(52) U.S. Cl. ......................... 455/90; 455/550; 455/566; 455/347; 379/433; 379/429; 379/368
(58) Field of Search .................................... 345/168, 169; 361/680, 681; 455/550, 566, 90, 347; 379/368, 369, 370, 433, 429; 206/470, 467, 461, 387.13; 220/324; 383/96

(56) References Cited

U.S. PATENT DOCUMENTS

| | | | |
|---|---|---|---|
| 4,872,551 | * 10/1989 | Theros | 206/470 |
| 5,555,550 | * 9/1996 | Kaschke | 455/566 |
| 5,584,387 | * 12/1996 | Grant | 206/470 |
| 5,850,914 | * 12/1998 | Patterson | 206/387.13 |
| 6,041,120 | * 3/2000 | Olkkola | 379/433 |

FOREIGN PATENT DOCUMENTS

0702478A2   3/1996   (EP) .............................. H04M/1/02

\* cited by examiner

*Primary Examiner*—Dwayne Bost
*Assistant Examiner*—Raymond B. Persino
(74) *Attorney, Agent, or Firm*—Dicran Halajian

(57) ABSTRACT

A fitting device is formed by a mat of elastic material having a keyboard and a housing for a display panel. The mat further includes an extension part beyond the housing, formed by a locking frame which can be folded onto the housing and has fasteners in a bent-away position. A handset is provided with the fitting device and includes positioners for positioning the fitting device relative to the handset housing.

4 Claims, 2 Drawing Sheets

FITTING DEVICE FOR SEPARATE ELEMENTS OF A MOBILE TELEPHONE HANDSET AND THE HANDSET THUS OBTAINED

FIELD OF THE INVENTION

The present invention relates to a fitting device for separate elements of a mobile telephone handset, formed by a mat of elastic material comprising at least a keyboard and a housing for a display panel.

The invention also relates to a mobile telephone handset having such a fitting device.

The mobile telephone is an apparatus that, without being particularly fragile, drops more often than other electronic apparatus because in most cases it is manipulated with one hand. Hence the increasing tendency to provide the mobile telephone with elastic fitting elements inside the housing which in case of shock act as shock absorbers for the elements contained in the housing.

Besides, such apparatus have separate elements at the front that capture or emit information such as the microphone, the keyboard, the display panel and the earphone. When the apparatus is being assembled, the separate elements are to be mutually positioned with rather much precision because they are to correspond with openings made in the front face of the housing. The fitting of these elements in an elastic mat provides the desired mutual positioning that facilitates the mounting.

BACKGROUND OF THE INVENTION

Such an elastic mat comprising the separate front elements is notably known from European patent application EP-A 0 702 478. The mat of flexible material is fastened by its curved ends to the ends of a printed circuit. Furthermore, besides an orifice for accommodating the microphone and passing the keyboard keys through, this mat comprises a first housing for the display panel and a second housing for the earphone, these housings having curved walls which ensure that these two elements are kept in place during mounting, and the back part forming a frame of the walls of these housings ensures a proper elastic fitting of the elements against the inside part of the front half of the body.

Such a mat indeed provides the above advantages of ease of mounting and resistance to shock. However, such a mat made by injection molding is hard to realize because the back parts for keeping the display panel, the earphone and the assembly on the printed circuit board in place imply the use of inserts which co-operate with the walls of the mold. Putting in these inserts and extracting them afterwards with each molding operation complicate this operation and increase its duration, which leads to an increase of the unit cost of each manufactured mat, it being understood that the cost of elastomer material used is low relative to that of the actual molding operation.

SUMMARY OF THE INVENTION

It is an object of the invention to provide an elastic mat of a flexible material for fitting in separate mobile telephone elements obtained by molding, without the necessity of inserts.

According to the invention, this object is achieved and the drawbacks of the prior art are mitigated thanks to the fact that the fitting device defined in the opening paragraph is characterized in that said mat further includes an extension part beyond said housing, formed by a locking frame which can be folded onto said housing, and has means for fastening it in folded position.

The display panel locked into said housing may thus be positioned exactly relative to the keys of the keyboard and a flexible fitting in forward direction of this panel is ensured after separate elements are mounted against the front half of the body.

It is another object of the invention to enable a correct positioning of the flat connection cable which connects the display panel to the other components of the apparatus.

For this purpose, an advantageous embodiment of the invention is characterized in that said mat further includes between said housing and said extension part a slimmer intermediate part forming a hinge and having a slot intended for passing the flat connection cable of said display panel through.

Beyond said slot, the flat connection cable is connected to conducting tracks of the printed circuit which supports the mat of plastic material.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE INVENTION

In the Figures like references represent like elements having like functions.

Figure 1:
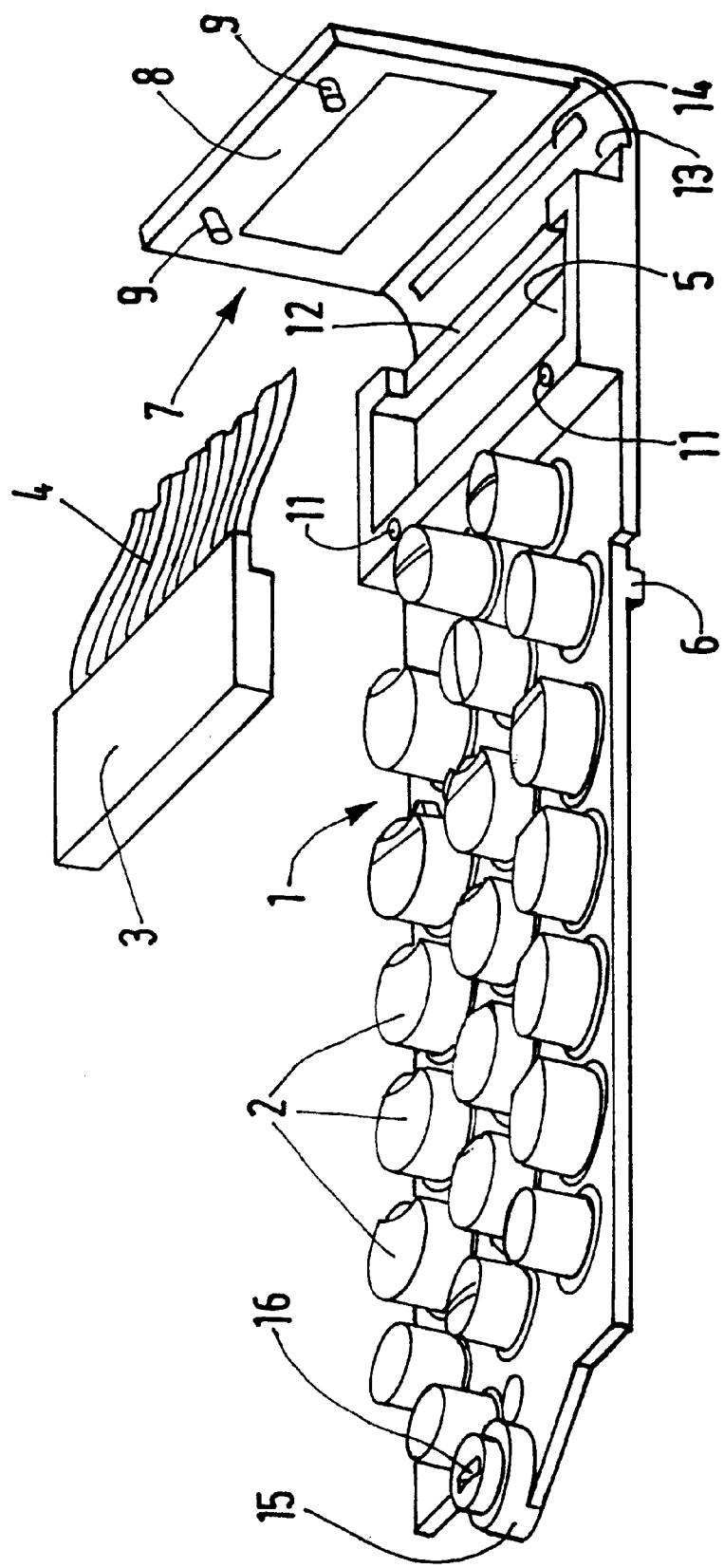
FIG. 1 is a perspective view of the fitting device according to the invention.

The fitting device 1 represented in FIG. 1 is designed for positioning separate elements of a mobile telephone handset. These elements are, in essence, a keyboard formed by a set of keys 2 and a display panel 3, more often than not called a liquid crystal display LCD. The display panel 3 is designated display in the following of the text. These two elements are not fixedly connected to the front half of the body of the handset, nor to the printed circuit (20, FIG. 2) inside, which comprises other elements, that is, fixedly mounted components. For this reason, the keyboard and the display are described as separate elements for which it is suitable to position them in a comparatively precise manner: on the one hand, the keys of the keyboard relative to the electrical contacts (not shown) positioned opposite on the printed circuit and for which these keys are to work, and, on the other hand, the display 3 connected by a flexible flat connection cable 4 of which it is a matter that it is positioned exactly opposite a corresponding port (21, FIG. 2) provided in the front half 22 of the apparatus.

A means to satisfy the positioning constraints indicated in the previous paragraph consists of realizing the keys of the keyboard in the form of a flexible mat (keys 2) and in that this flexible mat comprises as an extension of the keyboard a housing 5 for the display. The correct final positioning of the elements 2 and 3 is obtained when the apparatus is being mounted, because the flexible mat 1 is positioned exactly relative to the printed circuit against which it is pressed. For this purpose, according to a preferred embodiment, lugs 6 protruding from the back of the mat 1 are provided to be embedded in the openings 23 of the printed circuit 20. In known manner this printed circuit 20 itself is positioned correctly relative to the front half 22.

Besides the correct positioning of the display 3 relative to the port 21 (FIG. 2), it is convenient to ensure a proper fitting of this display against the front half 22 of the handset. According to the invention, this fitting is realized by means of a flap 7. This flap consists of an extension part of the flexible mat 1 which already comprises the elements 2 and 5; it is formed by a locking frame 8 intended to be folded up against the housing 5 after the display 3 has been inserted. To facilitate the mounting of the mat 1, means are provided for fastening the frame 8 in folded position against the display 3. According to a preferred embodiment of the invention, the mat 1 is formed by a molded elastomer material and the fastening means consist of at least one lug on the flap 8 or on the walls of the housing 5 to be pushed into a recess in the walls of the housing 5 or of the frame 8. In FIG. 1, two lugs 9 on the frame 8 are thus called to co-operate with two recesses 11 in the walls of the housing 5 to ensure the fastening mentioned above.

Figure 2:
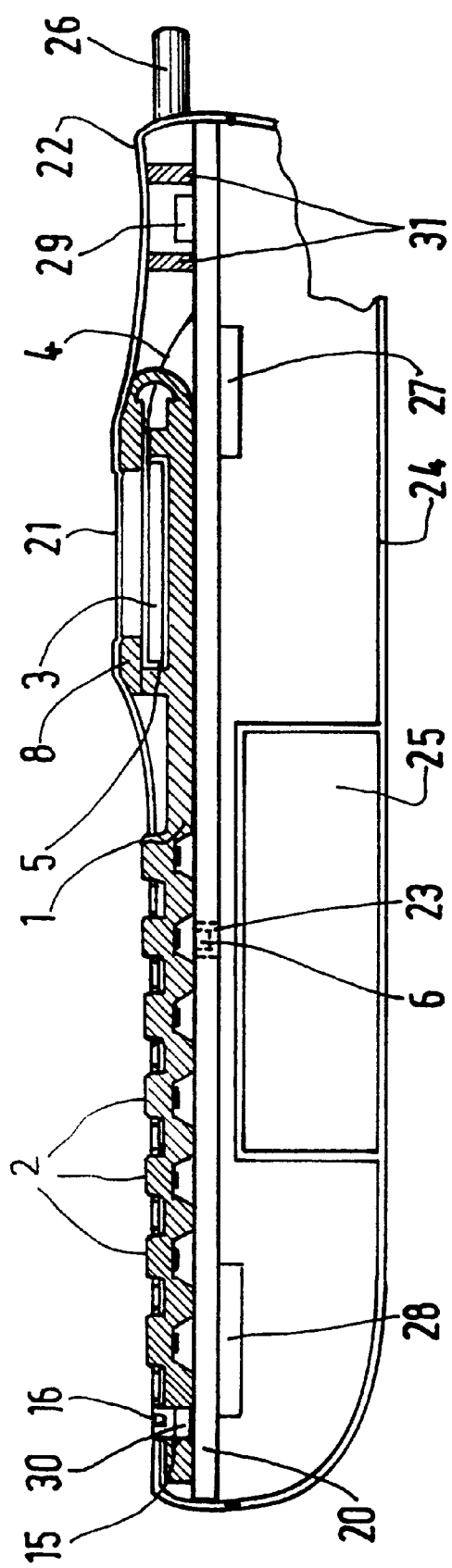
FIG. 2 is a cross-sectional view of a mobile telephone handset incorporating the fitting device shown in FIG. 1.

As already indicated above, a mat or flat cable 4 electrically connects the display 3 to a printed circuit (20, FIG. 2). This flat cable is generally stuck onto the display 3 by means of an anisotropic conducting glue, either at half the thickness as represented in FIG. 1, or onto the front face as shown in FIG. 2. When the display is inserted into its housing 5, it is necessary that the flat cable 4 can be taken out without thwarting this insertion. For this purpose, a beveled edge 12 has been provided in the upper wall of the housing 5. This beveled edge is not necessary, however, with the display of FIG. 2. Coming back to the printed circuit 20 (FIG. 2), it is advantageous for the flat cable 4 to pass through the elastic mat 1. For this purpose, according to an advantageous embodiment of the invention, the mat 1 comprises between the housing 5 and the frame 8 a part 13 forming a hinge for the frame 8, preferably the slimmer intermediate part, and having a slot 14 intended for passing the flat cable 4 through.

FIG. 2 represents in simplified form a mobile telephone handset comprising a body formed by the front half 22, a back half 24, a housing 25 for the battery made in the back half. In addition to the body, FIG. 2 also represents an antenna 26 and the printed circuit 20 fitted in the body. To the printed circuit 20 are connected integrated circuits such as 27, 28 and other active or passive components which are not shown. On the side of the front face of the handset, the elastic mat 1 is kept in correct position by the positioning means 6 and 23 and caught between the printed circuit 20 and the front half 22. Thus, the display 3 is well kept in side and front position even in case of shock. FIG. 2 also represents an earpiece 29 and a microphone 30. The positioning of these two elements is both less critical and easier to realize than that of the keyboard and of the display: less critical because larger tolerances of their side position relative to corresponding cavities in the body half may be permitted, and easier to realize because these two elements are more often than not rigidly linked to the printed circuit 20 so as to ensure their electrical connection and mechanical connection to the device. It will be noted that in the FIGS. 1 and 2 a housing 15 for the microphone 30 having an opening 16 for voice to pass through is provided in the mat 1. This arrangement, even if it does not form an essential part of the invention, is advantageous, however, for it enables to protect the microphone 30 mechanically and is involved in the precise fastening and positioning of the mat 1 against the printed circuit 20, which facilitates the mounting of the device and makes the mounting faster.

The earpiece 29 is mounted in known conventional manner: at least one piece of flexible material 31 firmly attached to the front half 22 and/or the circuit 20 is provided in its immediate proximity, which ensures a proper fitting of these last two elements at the place of the earpiece 29, ensuring a proper protection against shocks and permitting to avoid parasitic resonance vibrations of certain nearby elements which could result from the reconstituted voice of the remote speaker. Preferably, the part 31 does not completely surround the earpiece 29, so that a sufficient resonance volume is retained around the earpiece.

What is claimed is:

1. A fitting device for separate elements of a mobile telephone handset, formed by a mat of elastic material, said mat comprising:

at least a keyboard and a housing for a display panel;

an extension part beyond said housing, said extension part being formed by a locking frame which can be folded onto said housing, said locking frame having fastening means for fastening said locking frame in folded position; and an intermediate part located between said housing and said extension part, said intermediate part forming a hinge and having a slot intended for passing a connection cable of said display panel.

2. A fitting device as claimed in claim 1, wherein said fastening means are formed by at least one lug on said locking frame pushed into a recess in walls of said housing.

3. A mobile telephone handset comprising:

a body;

a printed circuit fastened to said body;

a fitting device; and positioning means for positioning said fitting device relative to said printed circuit and said body;

wherein said fitting device is formed by a mat of elastic material, said mat comprising:

at least a keyboard and a housing for a display panel;

an extension part beyond said housing, said extension part being formed by a locking frame which can be folded onto said housing, said locking frame having means for fastening said locking frame in folded position; and an intermediate part located between said housing and said extension part, said intermediate part forming a hinge and having a slot intended for passing a connection cable of said display.

4. A mobile radio telephone as claimed in claim 3, wherein said positioning means are formed by at least two lugs of said fitting device pushed into corresponding recesses of said printed circuit.

* * * * *